United States Patent
Wu et al.

(10) Patent No.: US 11,457,377 B2
(45) Date of Patent: Sep. 27, 2022

(54) METHODS FOR DISTANCE-BASED HYBRID AUTOMATIC REPEAT REQUEST (HARQ) FEEDBACK TRANSMISSION

(71) Applicant: QUALCOMM Incorporated, San Diego, CA (US)

(72) Inventors: Shuanshuan Wu, San Diego, CA (US); Arthur Gubeskys, San Diego, CA (US); Sudhir Kumar Baghel, Hillsborough, NJ (US); Gabi Sarkis, San Diego, CA (US); Kapil Gulati, Belle Mead, NJ (US); Richard Reid Hovey, Branchburg, NJ (US); Deviprasad Putchala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/069,616

(22) Filed: Oct. 13, 2020

(65) Prior Publication Data

US 2021/0112445 A1    Apr. 15, 2021

Related U.S. Application Data

(60) Provisional application No. 62/916,761, filed on Oct. 17, 2019, provisional application No. 62/914,805, filed on Oct. 14, 2019.

(51) Int. Cl.
*H04W 4/00* (2018.01)
*H04W 24/00* (2009.01)
(Continued)

(52) U.S. Cl.
CPC .......... *H04W 28/04* (2013.01); *H04W 4/023* (2013.01); *H04W 92/18* (2013.01)

(58) Field of Classification Search
CPC .............................. H04W 28/04; H04W 4/023
See application file for complete search history.

(56) References Cited

U.S. PATENT DOCUMENTS

| | | |
|---|---|---|
| 2020/0100048 A1 | 3/2020 | Wu et al. |
| 2020/0260214 A1 | 8/2020 | Wu et al. |

(Continued)

OTHER PUBLICATIONS

Huawei., et al., "Sidelink Physical Layer Procedures for NR V2X", 3GPP Draft, 3GPP TSG RAN WG1 Meeting #98bis, R1-1910059, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 8, 2019 (Oct. 8, 2019), XP051809069, 30 Pages, Section 5.3.

(Continued)

*Primary Examiner* — Erika A Washington
(74) *Attorney, Agent, or Firm* — Danai Nelisile Mhembere; Patterson & Sheridan, LLP

(57) ABSTRACT

Certain aspects of the present disclosure provide techniques for distance-based HARQ feedback transmission. A method that may be performed by a user equipment (UE) includes monitoring for a data transmission from another UE, receiving an indication of a first zone identifier (ID), determining a nearest zone to the UE of multiple zones, wherein the multiple zones are determined based at least in part on the indication of the first zone ID, determining a distance between the UE and the other UE based on the first zone ID, wherein the determined distance comprises a distance between the UE and the nearest zone, and transmitting hybrid automatic repeat request (HARQ) feedback for the data transmission based at least on the distance.

29 Claims, 11 Drawing Sheets

(51) Int. Cl.
  *H04W 28/04*  (2009.01)
  *H04W 4/02*  (2018.01)
  *H04W 92/18*  (2009.01)

(56) References Cited

U.S. PATENT DOCUMENTS

2020/0336872 A1* 10/2020 Basu Mallick ....... H04W 4/029
2020/0344722 A1* 10/2020 He ................... H04W 72/0446

OTHER PUBLICATIONS

International Search Report and Written Opinion—PCT/US2020/055580—ISA/EPO—dated Feb. 2, 2021.
LG Electronics: "Discussion on Physical Layer Procedures for NR Side Link", 3GPP TSG RAN WG1 Meeting #98bis, 3GPP Draft; R1-1910783 Discussion on Physical Layer Procedure for NR Sidelink, 3rd Generation Partnership Project (3GPP), Mobile Competence Centre, 650, Route Des Lucioles, F-06921 Sophia-Antipolis, vol. RAN WG1, No. Chongqing, China; Oct. 14, 2019-Oct. 20, 2019, Oct. 8, 2019 (Oct. 8, 2019), 23 Pages, XP051809189, the whole document.
Samsung: "On Physical Layer Procedures for NR V2X", 3GPP TSG RAN WG1 #98bis, 3GPP draft; R1-1910475 on Physical Layer Procedures for NR V2X, 3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14, 2019-Oct. 20, 2019, Oct. 8, 2019 (Oct. 8, 2019), 22 Pages, XP051809132, the whole document.

* cited by examiner

METHODS FOR DISTANCE-BASED HYBRID AUTOMATIC REPEAT REQUEST (HARQ) FEEDBACK TRANSMISSION

CROSS-REFERENCE TO RELATED APPLICATION(S)

This application claims benefit of and priority to U.S. Provisional Application No. 62/914,805, filed Oct. 14, 2019, and U.S. Provisional Application No. 62/916,761, filed Oct. 17, 2019, which are hereby assigned to the assignee hereof and hereby expressly incorporated by reference herein in their entirety as if fully set forth below and for all applicable purposes.

INTRODUCTION

Aspects of the present disclosure relate to wireless communications, and more particularly, to techniques for feedback signaling.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved feedback signaling.

Certain aspects provide a method for wireless communication by a user-equipment (UE). The method generally includes monitoring for a data transmission from another UE, receiving an indication of a first zone identifier (ID) associated with a first zone of a plurality of zones in which the other UE is located, determining a distance between the UE and the other UE based on the first zone ID, and transmitting hybrid automatic repeat request (HARQ) feedback for the data transmission based at least on the distance.

Certain aspects provide an apparatus for wireless communication by a UE. The apparatus generally includes a memory, and one or more processors coupled to the memory, the one or more processors and the memory being configured to monitor for a data transmission from another UE, a receiver configured to receive an indication of a first zone ID associated with a first zone of a plurality of zones in which the other UE is located, the processing system being further configured to determine a distance between the UE and the other UE based on the first zone ID, and a transmitter configured to transmit HARQ feedback for the data transmission based at least on the distance.

Certain aspects provide an apparatus for wireless communication by a UE. The apparatus generally includes means for monitoring for a data transmission from another UE, means for receiving an indication of a first zone ID associated with a first zone of a plurality of zones in which the other UE is located, means for determining a distance between the UE and the other UE based on the first zone ID, and means for transmitting HARQ feedback for the data transmission based at least on the distance.

A computer-readable medium having instruction stored thereon to cause a UE to monitor for a data transmission from another UE, receive an indication of a first zone ID associated with a first zone of a plurality of zones in which the other UE is located, determine a distance between the UE and the other UE based on the first zone ID, and transmit HARQ feedback for the data transmission based at least on the distance.

Certain aspects provide a method for wireless communication by a UE. The method generally includes monitoring for a data transmission from another UE, receiving an indication of a first zone ID, determining a nearest zone to the UE of multiple zones, wherein the multiple zones are determined based at least in part on the indication of the first zone ID, determining a distance between the UE and the other UE based on the first zone ID, wherein the determined distance comprises a distance between the UE and the nearest zone, and transmitting HARQ feedback for the data transmission based at least on the distance.

Certain aspects provide an apparatus for wireless communication by a UE. The apparatus generally includes a memory, and one or more processors coupled to the memory, the one or more processors and the memory being configured to monitor for a data transmission from another UE, receive an indication of a first zone ID, determine a nearest zone to the UE of multiple zones, wherein the multiple zones are determined based at least in part on the indication of the first zone ID, determine a distance between the UE and the other UE based on the first zone ID, wherein the determined distance comprises a distance between the UE and the nearest zone, and transmit HARQ feedback for the data transmission based at least on the distance.

Certain aspects provide an apparatus for wireless communication by a UE. The apparatus generally includes means for monitoring for a data transmission from another UE, means for receiving an indication of a first zone ID, means for determining a nearest zone to the UE of multiple zones, wherein the multiple zones are determined based at least in part on the indication of the first zone ID, means for determining a distance between the UE and the other UE based on the first zone ID, wherein the determined distance comprises a distance between the UE and the nearest zone, and means for transmitting HARQ feedback for the data transmission based at least on the distance.

A computer-readable medium having instruction stored thereon to cause a UE to monitor for a data transmission from another UE, receive an indication of a first zone ID, determine a nearest zone to the UE of multiple zones, wherein the multiple zones are determined based at least in part on the indication of the first zone ID, determine a distance between the UE and the other UE based on the first zone ID, wherein the determined distance comprises a distance between the UE and the nearest zone, and transmit HARQ feedback for the data transmission based at least on the distance.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
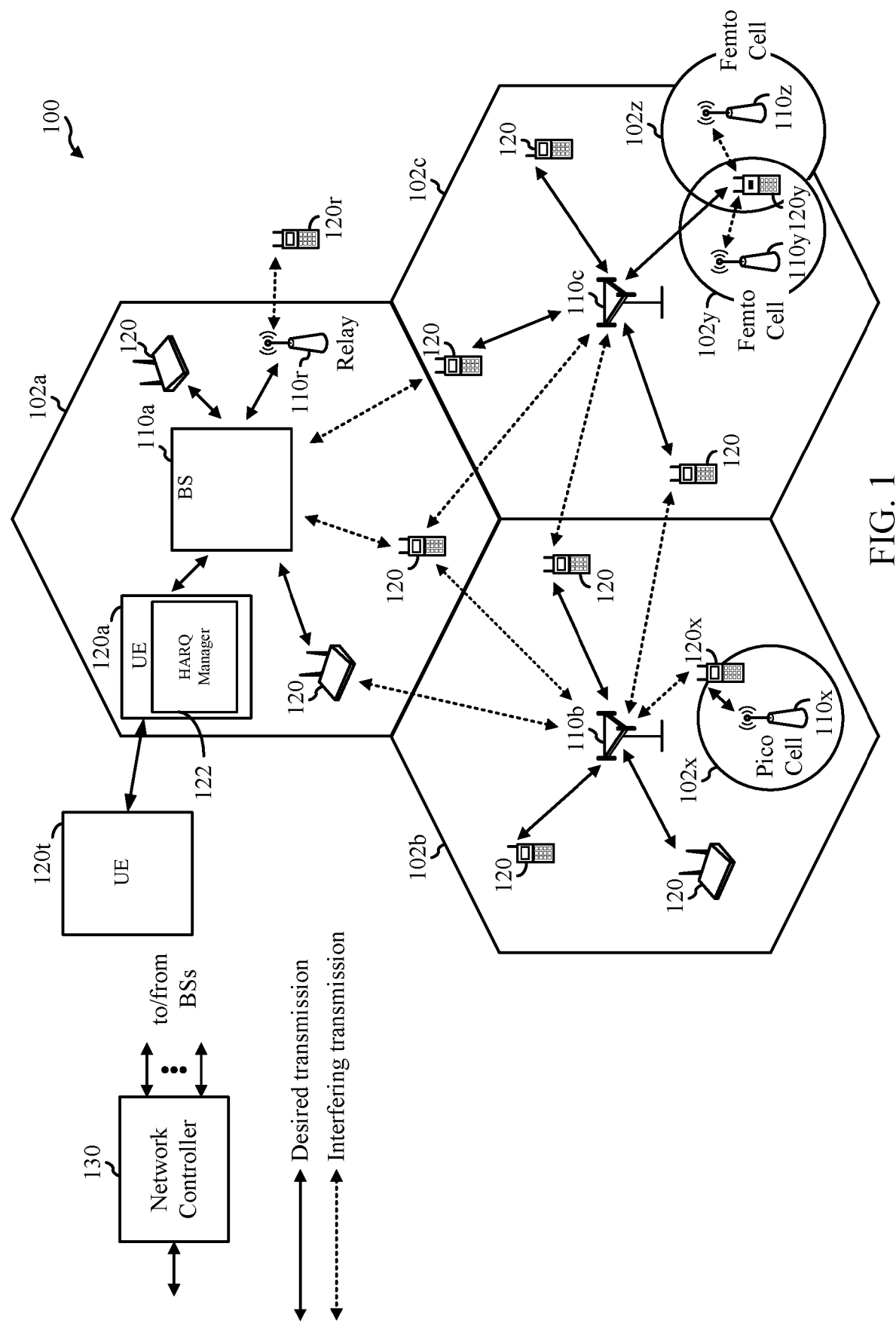
FIG. 1 is a block diagram conceptually illustrating an example telecommunications system, in accordance with certain aspects of the present disclosure.

Aspects of the present disclosure provide apparatus, methods, processing systems, and computer readable mediums for distance-based hybrid automatic repeat request (HARQ) feedback transmission. For sidelink communication, an acknowledgement feedback from a data receiver user-equipment (UE) (also referred to as a "Rx UE") to a data transmitter UE (also referred to as a "Tx UE") may only be sent if the distance between the UEs is less than a threshold. Thus, the Rx UE may determine the distance between the Rx UE and the Tx UE for HARQ transmission. In certain aspects of the present disclosure, the distance between the UEs may be determined using geographical zones to reduce signaling overhead. In other words, instead of the Tx UE transmitting the exact coordinates of the Tx UE to the Rx UE for the Rx UE to determine the distance, the Tx UE may transmit an identifier of geographical zone in which the Tx UE is located. The Rx UE may then determine the distance based on the zone ID indicated by the Tx UE, as well as the coordinates of the Rx UE or another zone ID of a zone in which the Rx UE is located.

The following description provides examples of distance-based HARQ feedback in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for distance-based on HARQ signaling. As shown in FIG. 1, the UE 120a includes a HARQ manager 122. The HARQ manager 122 may be configured to determine a distance between the UE 120a and UE 120t, based on which the UE may determine whether to transmit HARQ feedback, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
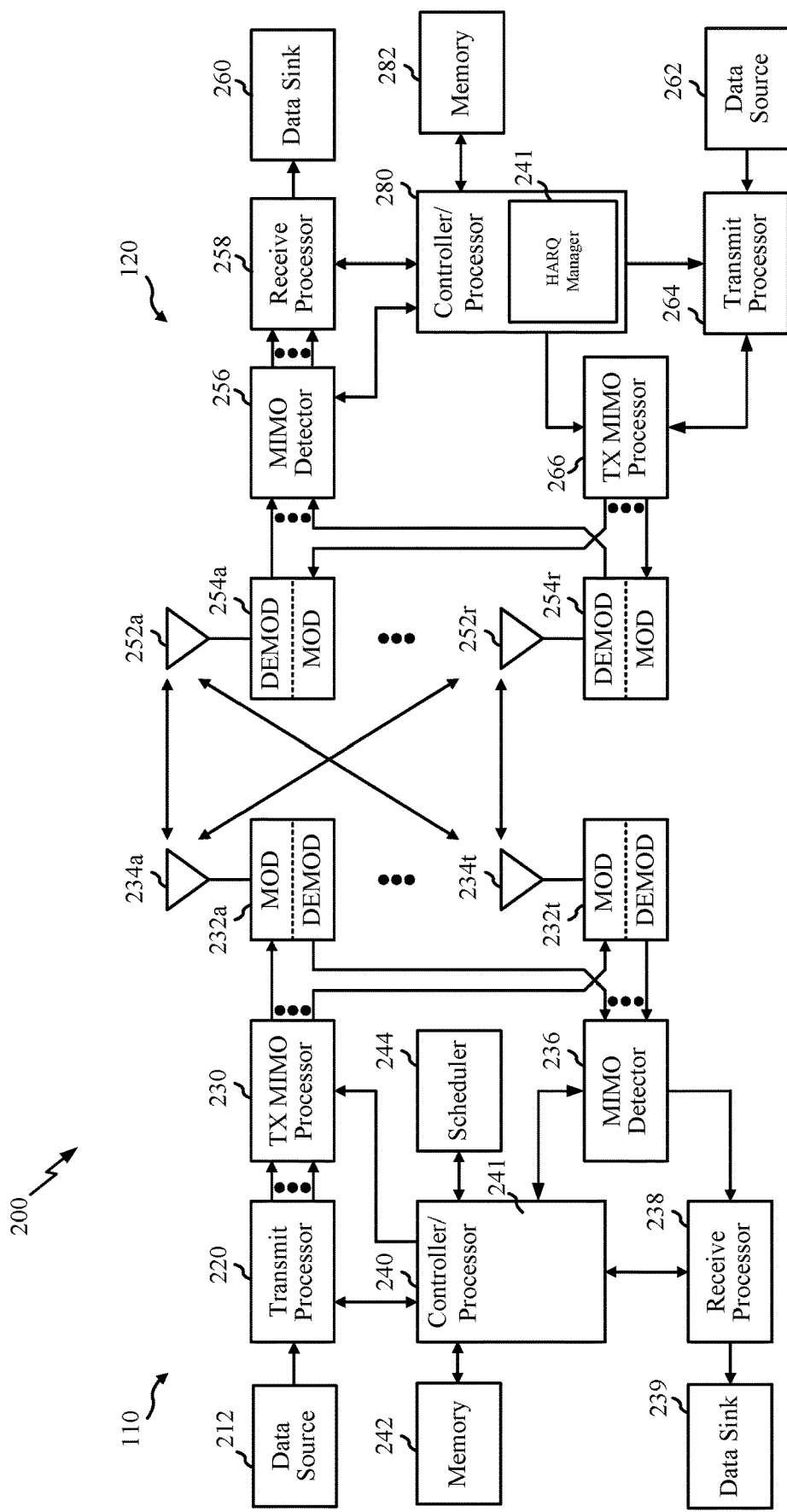
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has a HARQ manager 241 that may be configured to determine a distance between the UE 120a and UE 120t, based on which the UE may determine whether to transmit HARQ feedback, according to aspects described herein. Although shown at the Controller/Processor, other components of the UE 120a and BS 110a may be used performing the operations described herein.

Figures 3A, 3B:
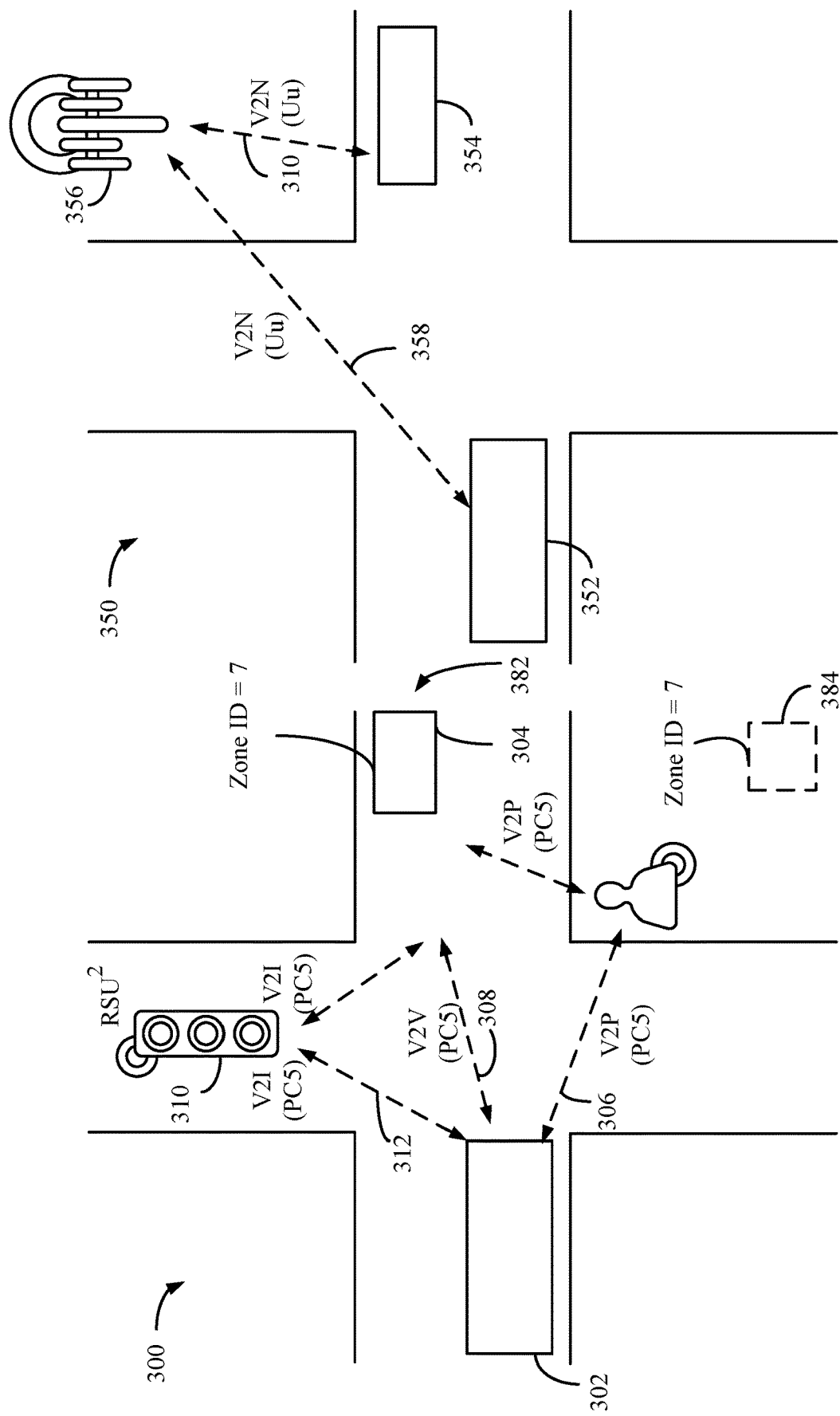
FIGS. 3A and 3B show diagrammatic representations of example vehicle to everything (V2X) systems in accordance with some aspects of the present disclosure.

FIGS. 3A and 3B show diagrammatic representations of example vehicle to everything (V2X) systems in accordance with some aspects of the present disclosure. For example, the UEs shown in FIGS. 3A and 3B may communicate via sidelink channels and may perform sidelink CSI reporting as described herein.

The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE).

Referring to FIG. 3A, a V2X system 300 (for example, including vehicle to vehicle (V2V) communications) is illustrated with two UEs 302, 304 (e.g., vehicles). The first transmission mode allows for direct communication between different participants in a given geographic location. As illustrated, a vehicle can have a wireless communication link 306 with an individual (V2P) (for example, via a UE) through a PC5 interface. Communications between the UEs 302 and 304 may also occur through a PC5 interface 308. In a like manner, communication may occur from a UE 302 to other highway components (for example, highway component 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

As illustrated in FIG. 3A, the UE 304 may be in a zone 382 associated with a zone ID (e.g., zone ID=7). However, the zone ID may correspond to multiple zones, such as zone 382 and zone 384, as illustrated. In some aspects of the present disclosure, the UE 302 may receive an indication of the zone ID (e.g., 7), and determine multiple distances for each of the zones indicated by the zone ID. For example, the UE may determine a distance between the UE 302 and the zone 382 in which the UE 304 is located, and a distance between the UE 302 and zone 384. The UE 302 may then determine the distance between the UE 302 and the UE 304 to be a minimum of the determined distances to zones 382, 384.

FIG. 3B shows a V2X system 350 for communication between a UE 352 (e.g., vehicle) and a UE 354 (e.g., vehicle) through a network entity 356. These network communications may occur through discrete nodes, such as a base station (for example, an eNB or gNB), that sends and receives information to and from (for example, relays information between) UEs 352, 354. The network communications through vehicle to network (V2N) links 358 and 310 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Example Techniques for Distance-Based Feedback Transmission

Certain aspects of the present disclosure are generally directed to sidelink communication (e.g., communication between UEs, such as vehicle-to-vehicle <V2V/V2X> communications, as described with respect to FIGS. 3A and 3B). In V2X communications, hybrid automatic repeat request (HARQ) feedback transmission may be based on distance. For example, a data receiver UE (also referred to herein as "Rx UE") may send HARQ feedback back to a data transmitter UE (also referred to herein as "Tx UE") only when the distance between the UEs is smaller than a distance threshold. For distance based HARQ, geographical location of the Tx UE may be determined at the Rx UE in order for the Rx UE to determine whether to transmit HARQ feedback. For instance, the Tx UE may indicate its location to the Rx UE so that the UE is able to determine the distance from the Tx UE's location and the location of the Rx UE.

Certain aspects of the present disclosure are directed to determining a distance between an Rx UE and a Tx UE using geographical zones. Geographical zones are used for the signaling of UE location with reduced overhead. For instance, the earth may be partitioned into zones based on Global Navigation Satellite System (GNSS) positioning, each zone having a configured size (e.g., 50×50 meters). Part of a zone identifier (ID) (e.g., least significant bits (LSBs) of a zone ID) may be signaled from a Tx UE to a Rx UE for the purpose of determining the distance between the UEs for distance based HARQ feedback. The signaling overhead may be reduced as compared to directly signaling the UE's location (e.g., latitude and longitude coordinates), which is important since the signaling overhead associated with indicating the absolute location/coordinates of the Tx UE may not be acceptable at lower layers.

Figure 4A:
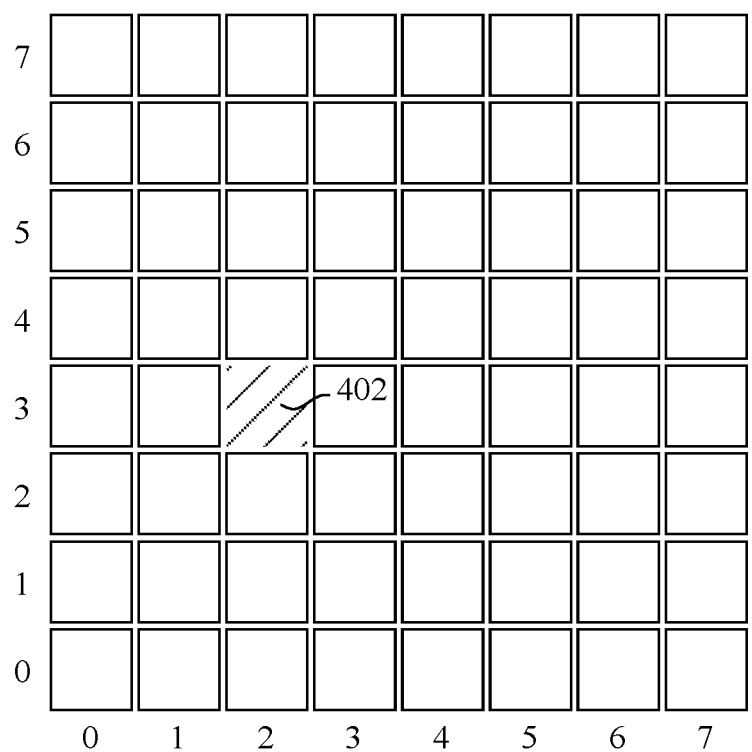
FIGS. 4A and 4B illustrate a cluster of zones including a zone in which a receiver UE may be located.
Figure 4B:
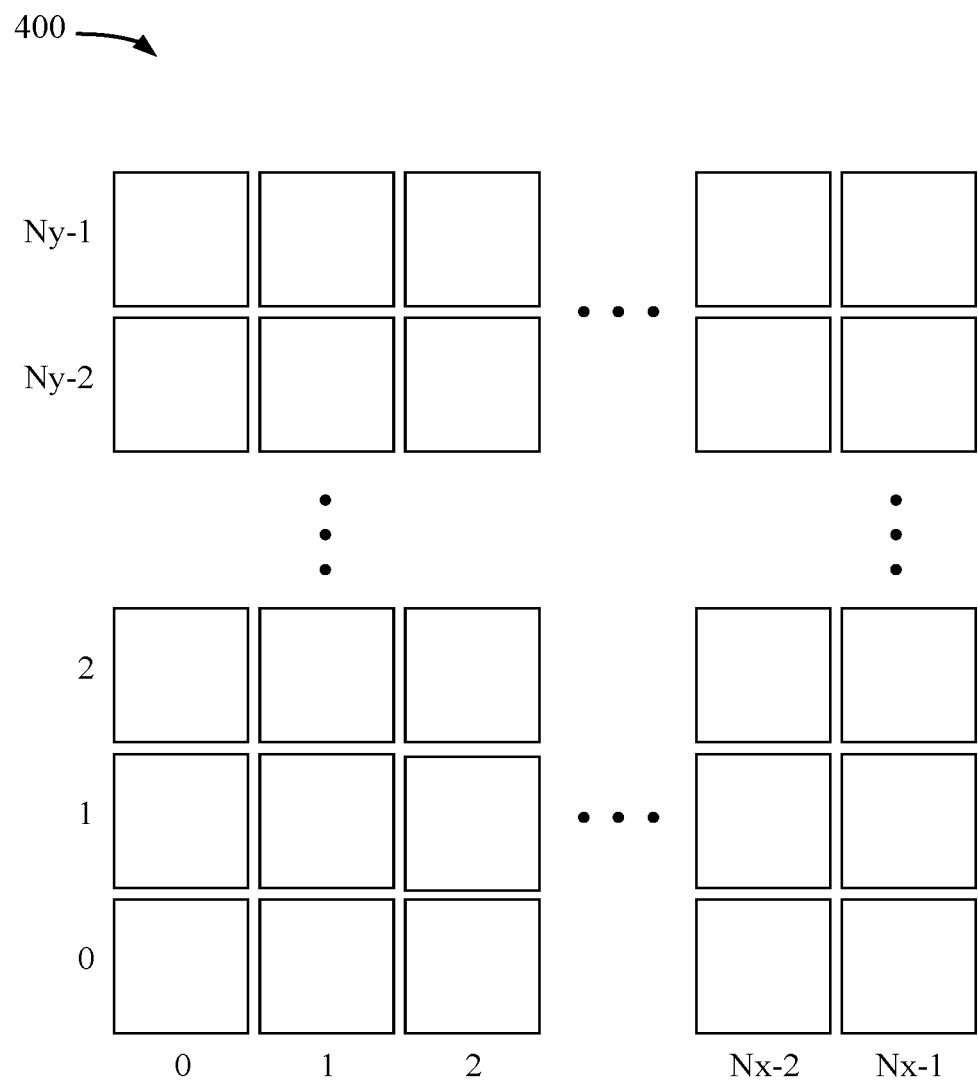

FIGS. 4A and 4B illustrate a cluster of zones 400 including a zone 402 in which an Rx UE may be located. The zone 402 may be associated with a zone ID. In certain aspects, a zone ID of a zone in which an Rx UE is located (or tx UE is located) may be computed by an Rx UE (or a Tx UE), using the following equation:

$x_1$=Floor (x/L) Mod Nx
$y_1$=Floor (y/W) Mod Ny;
Zone ID=$y_1$* Nx+xi where L is the length of a zone, W is the width of a zone, Nx is the number of zones in a longitudinal direction, Ny is the number of zones in a latitudinal direction, and x (or y) is the geodesic distance in longitude (or in latitude) between UE's current location and geographical coordinates (0, 0) (e.g., the equator and prime meridian). In other words, x (e.g., latitudinal distance) and y (e.g., longitudinal distance) represent the location of the UE. The higher Nx and Ny are, the higher the resource overhead for indicating the zone ID. For example, 10 bits may be used to indicate zone ID if Nx=Ny=$2^5$=32 (e.g., 5 bits for Nx and 5 bits for Ny). For the cluster of zones 400 illustrated in FIG. 4, Nx=Ny=8. The UE may determine that $x_1$ is equal to 2 and $y_1$ is equal to 3 for zone 402. Therefore, the zone ID associated with zone 402 may be equal to 26 (e.g., 3×8+2=26).

Figure 5:
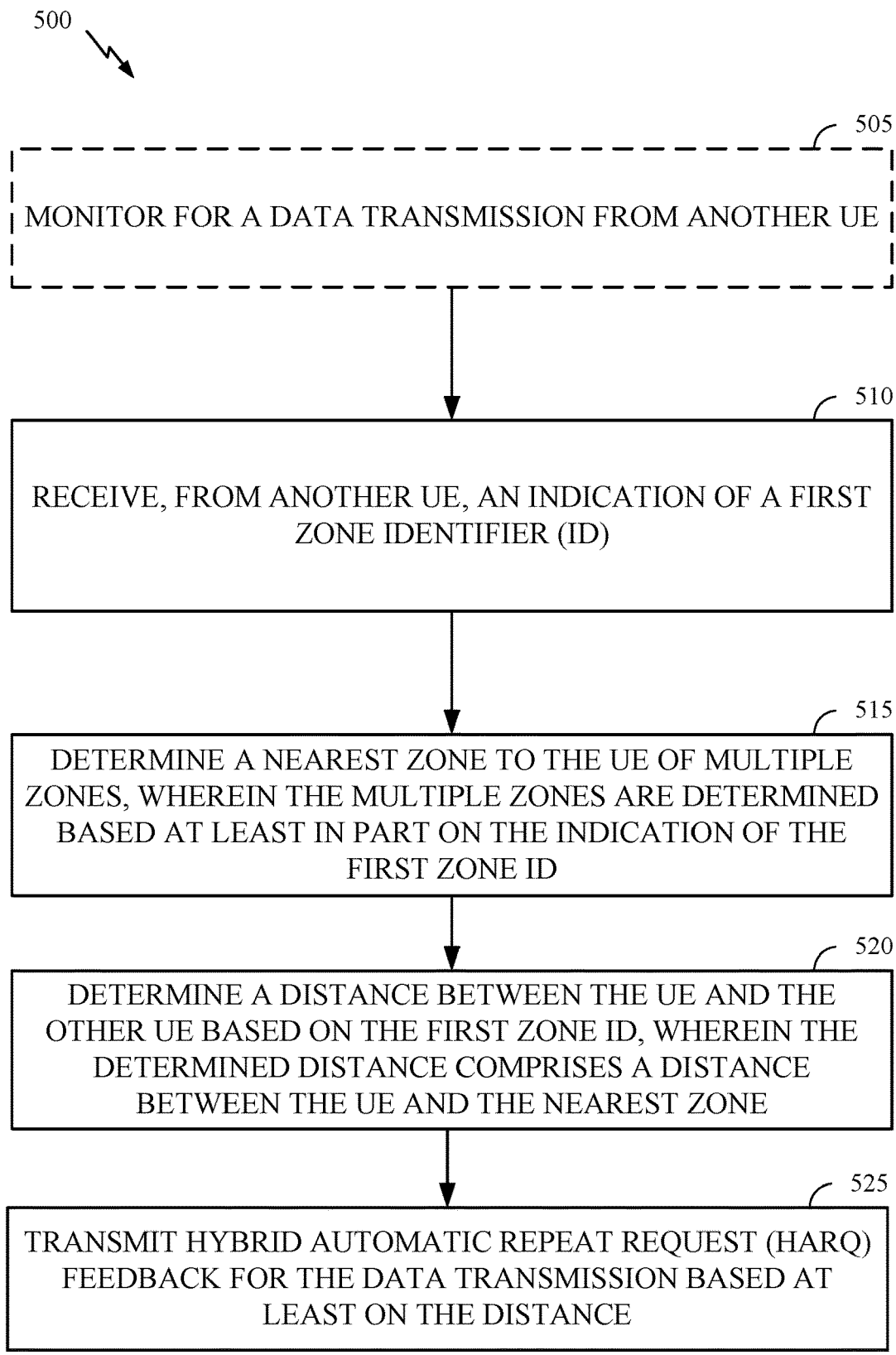
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by a UE (e.g., Rx UE) (e.g., such as a UE 120a in the wireless communication network 100).

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, with the UE optionally monitoring for a data transmission from another UE (e.g., Tx UE). At block 510, the UE receives, from another UE (e.g., Tx UE), an indication of a first zone identifier (ID). In certain aspects, the UE may, at block 515, determine a nearest zone to the UE of multiple zones, wherein the multiple zones are determined based at least in part on the indication of the first zone ID, and at block 520, determine a distance between the UE and the other UE based on the first zone ID. In some aspects, the determined distance may be a distance between the UE and the nearest zone. The distance may be determined based on a location of the Rx UE (e.g., geodesic distance coordinates), and the zone ID of the Tx UE, or based on the zone IDs of the Rx UE and the Tx UE, as described in more detail herein. At block 525, the UE may transmit HARQ feedback for the data transmission based on the distance.

In other words, an Rx UE receives the zone ID indication and data transmission from a Tx UE. The zone ID indication may be carried in sidelink control information, medium access control (MAC) control element, higher layer signaling, or any combination thereof. The higher layer signaling may include any signaling associated with a layer above the MAC layer, such as RRC signaling.

In certain aspects, the Rx UE determines distance from the Tx UE to the Rx UE, based on Tx UE's zone ID indication and the Rx UE's location. The Rx UE then determines to send HARQ feedback to the Tx UE based at least on the determined distance. In one example, the UE may transmit the HARQ feedback if the determined distance is less than a distance threshold and the feedback is a negative acknowledgment (NACK). That is, the HARQ feedback may be implemented as a NACK-only feedback. The UE may only send a NACK feedback, and not send feedback if the HARQ feedback is an acknowledgement (ACK) and the distance between the UE and the other UE is below the distance threshold. In another example, the UE may transmit the HARQ feedback if the determined distance is less than a distance threshold, regardless of whether the HARQ feedback is an ACK feedback or a NACK feedback.

In certain aspects, the determination of the distance, at block 515, may be based on the zone IDs associates with the zones in which the Rx UE and the Tx UE are located. For example, the Rx UE may determine the zone ID of the zone in which the Rx UE is located based on the geographical location (ego zone) of the Rx UE. The Rx UE computes the distance between the Tx UE and the Rx UE, based on the zone ID of the Rx UE, the zone ID of the Tx UE, and the zone size. The distance may be the distance between reference points of both zones. A reference point of a zone may be the center of the zone, in some examples. Thus, the distance between reference points may be the distance between center of the Rx UE zone and the center of the Tx UE zone. In another example, reference point of a zone may be one of the four corners of the zone. In other words, the Rx UE may determine how far apart the Tx UE and the Rx UE are in terms of number (quantity) of zones based on zone IDs. The Rx UE may then convert the separation of number of zones to distance (e.g., in meters, when the HARQ feedback distance requirement is also expressed in meters) based on the zone size (e.g., length and width of a zone).

Figure 6A:
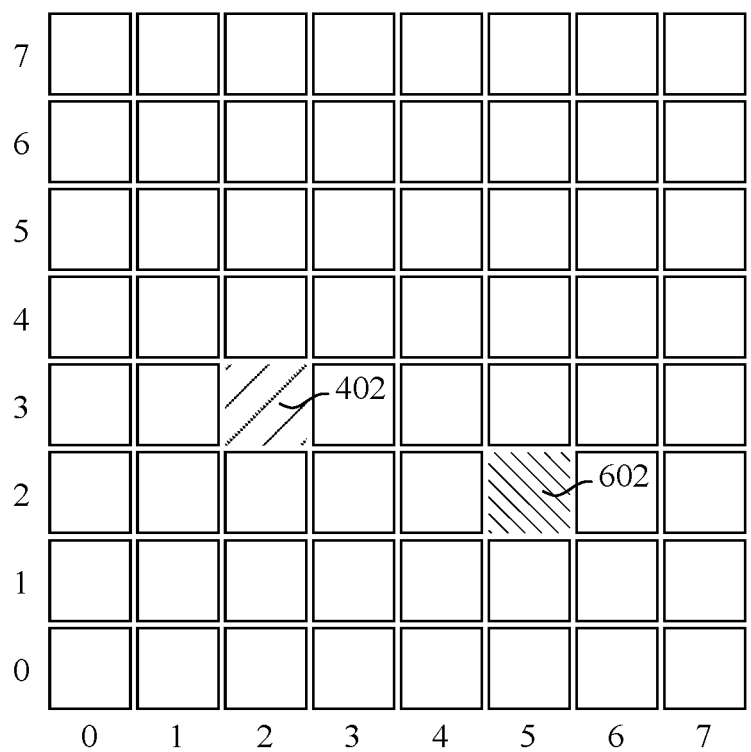
FIGS. 6A, 6B, and 6C illustrate a cluster of zones including a zone in which a receiver UE may be located and a zone in which a transmit UE is located, in accordance with certain aspects of the present disclosure.
Figure 6B:
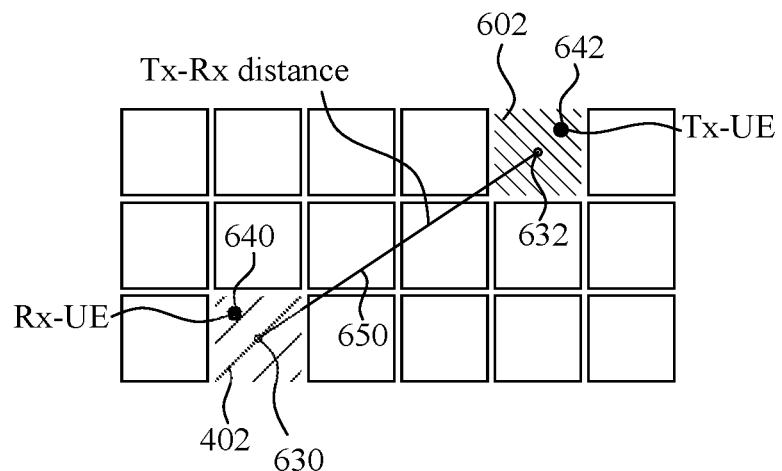
Figure 6C:
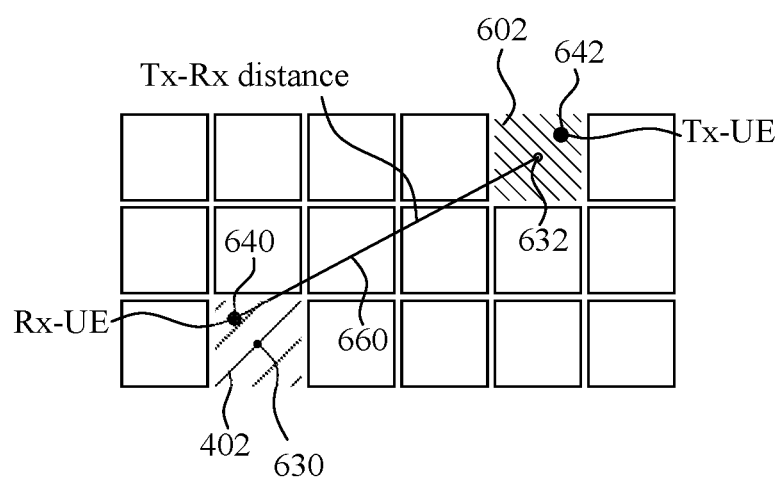

FIGS. 6A, 6B, and 6C illustrates a cluster of zones 400 including a zone 402 in which an Rx UE may be located and a zone 602 in which a Tx UE is located, in accordance with certain aspects of the present disclosure. As illustrated in FIG. 6B, in certain aspects, the distance 650 between the Rx UE 640 and the Tx UE 642 may be determined based on the distance between reference points 630, 632 (e.g., centers) of the respective zones 402, 602 of the Rx UE 640 and the Tx UE 642. The Rx UE 640 may be configured with a length L of a zone, and a width W of the zone, as well as Nx and Ny which are the number of zones that may be indicated for the longitude and latitude directions, respectively. For example, in the example cluster of zones 400, Nx=Ny=8 zones, which may be indicated using 3 bits (e.g., $2^3$=8), and a total of 6 bits may be used to indicate a zone.

An Rx UE may first determines (x,y) (also referred to as "geodesic distance coordinates") from its geographical coordinates. As described herein, x and y refers to the geodesic distance in longitude and in latitude, respectively, between the UE's current location and a reference point on earth (e.g., the geographical coordinates (0, 0)). Based on (x,y), Rx UE determines its zone ID (e.g., 26). In the example of FIG. 6A, $x_{1,Rx}$=2, $y_{1,Rx}$=3 for the Rx UE. The Rx UE also receives the Tx UE's zone ID indication (e.g., 21), based on which the Rx UE determines $x_{1,Tx}$=5, $y_{1,Tx}$=2 for the Tx UE, based on the following equations, which is the inversion of the zone ID computation, Zone ID=$y_1$*$N_{x+x_1}$:

$$x_1 = \mathrm{mod}(zoneID, N_x)$$

$$y_1 = \left\lfloor \frac{zoneID}{N_x} \right\rfloor$$

Based on the two zone IDs, the Rx UE determines the distance between the two corresponding zones, in terms of number of zones. For the example provided in FIG. 6, the distance expressed by number of zones may be $d_x=|x_{1,Rx}-x_{1,Tx}|=3$ zones in longitude and $d_y=|y_{1,Rx}-y_{1,Tx}|=1$ zone in latitude. Thus, the distance between the two zones may be determined (e.g., estimated) based on the equation:

$$d_{Tx-Rx}=\sqrt{(d_x L)^2+(d_y W)^2}$$

In other words, the Rx UE determines the transmitter-receiver distance 650 to be the distance between reference points 630, 632 in both zones 402, 602. The reference point may be common to all zones. For example, the reference point may be the center of a zone, or one of the four corners of the zone such as the point closest to geographical location (0, 0) (e.g., the equator and the prime meridian).

As illustrated in FIG. 6C, the determined distance 660 to be used for HARQ may be the distance between the actual location of the Rx UE 640 and the location of the zone 602 (e.g., location of the reference point 632 of the zone 602) in which the Tx UE 642 is located. For example, the Rx UE computes the distance between the two sets of coordinates (e.g., the coordinates of the zone indicated by Tx UE, and the coordinates of the Rx UE). The coordinates may be geodesic distances based on World Geodetic System (WGS) (e.g., WGS84 model). In other words, the coordinates of the Rx UE may be geodesic distance coordinates x and y, where x (or y) is the geodesic distance in longitude (or in latitude) between UE's current location and a reference point on the earth, for example, geographical coordinates (0, 0) (e.g., the equator and prime meridian), as described herein.

The determination of Tx UE's accurate coordinates at the Rx UE may be difficult if the Tx UE only signals a zone ID of the zone in which the Tx UE is located. Therefore, the Rx UE determines the coordinates of a reference point (e.g., center) of the Tx UE's zone, and computes distance based on the two the coordinates of the reference point of the Tx UE's zone and the coordinates of the Rx UE.

As described herein, the coordinates are coordinates expressed in distance (or length). For example, the two values in the geodesic distance coordinates are geodesic distance from coordinates (0, 0) in longitude and latitude, respectively. For the Tx UE, the geodesic distance coordinates are for a reference point of the zone in which the Tx UE is located, but for the Rx UE, the coordinates of the Rx UE are (x,y), which are a more accurate representation of the Rx UEs location (e.g., as compared to using geodesic distance coordinates of a reference point in a zone). The determination of the Tx UE's geodesic distance coordinates (e.g., coordinates of Tx UE's zone) may be determined by the Rx UE by first determining the zone ID of the Rx UE based on (x,y). The Rx UE can then determine how far apart the Rx UE is from the Tx UE in terms of a number of zones.

The Rx UE determines geodesic distance coordinates of the Rx UE's zone $(x_0, y_0)$, based on zone size (length/width) and zone ID. Here, the coordinates of the Rx UE's zone are the coordinates of a reference point in the zone, expressed in distance (or length). The Rx UE then determines coordinates of Tx UE's zone $(x_{0,Tx}, y_{0,Tx})$, based on the coordinates of the Rx UE's zone, and the distance between the two zones in terms of number of zones. The distance of the two UEs may be determined as distance between (x,y) and $(x_{0,Tx}, y_{0,Tx})$. In certain aspects, the distance may be computed (e.g., estimated) assuming the two sets of coordinates are on 2D surface.

As an example, the Rx UE may determine a zone size (e.g., L being the length of a zone and W being the width of a zone), and determine Nx/Ny which are the number of zones that can be indicated in longitude/latitude (e.g., assuming $Nx=Ny=2^3=8$), as described herein. The Rx UE's coordinates may be (x,y), x (or y) being the geodesic distance in longitude (or latitude) between UE's current location and geographical coordinates (0, 0), as described herein. The Rx UE may determine (x,y) from its geographical coordinates. Based on (x,y), Rx UE determines the zone ID (e.g., 26, i.e. $x_{1,Rx}=2$, $y_{1,Rx}=3$) of the zone in which the Rx UE is located. Based on (x,y), the Rx UE determines coordinates of its zone $(x_0, y_0)$ (e.g., a reference point of the zone in which Rx UE is located). For example, $(x_0, y_0)$ may be determined based on the following equation (e.g., they are coordinates of center of the zone expressed in distances):

$$x_0 = \left\lfloor \frac{x}{L} \right\rfloor \cdot L + \frac{L}{2}$$

$$y_0 = \left\lfloor \frac{y}{W} \right\rfloor \cdot W + \frac{W}{2}$$

The Rx UE also receives the Tx UE's zone ID indication (e.g., 21 in the example of FIG. 6). Tx UE's zone ID may be converted to a zone indication in longitude and latitude (e.g., $x_1$ and $y_1$). In this example, for zone ID=21, it is determined that $x_{1,Tx}=5$, $y_{1,Tx}=2$, using equations described herein. Based on the zone IDs of the Tx UE and Rx UE, the Rx UE determines that the distance between the zones in which the Rx UE and the Tx UE are located, in terms of number of zones, which may be $d_x=x_{1,Tx}-x_{1,Rx}=3$ zones in longitude, $d_y=y_{1,Tx}-y_{1,Rx}=-1$ zones in latitude, in the example of Rx UE and Tx UE locations illustrated in FIG. 6. The Rx UE then determines coordinates of the Tx UE's zone $(x_{0,Tx}, y_{0,Tx})$. For example, the coordinates of the Tx UE's zone may be determined using the following equations:

$$x_{0,Tx}=x_0+d_x \cdot L$$

$$y_{0,Tx}=y_0+d_y \cdot W$$

The distance between the Rx UE and the Tx UE is then determined using the equation:

$$d_{Tx-Rx}=\sqrt{(x_{0,Tx}-x)^2+(y_{0,Tx}-y)^2}$$

Certain aspects of the present disclosure provide techniques for an Rx UE to determine distance between UEs using zone ID signaling. For example, certain aspects provide techniques for a simplified distance estimation technique using the zone IDs of the Rx UE and Tx UE, and other aspects provide techniques for a more accurate (yet more complicated) distance estimation technique using both zone ID and geodesic distance coordinates.

Figure 8:
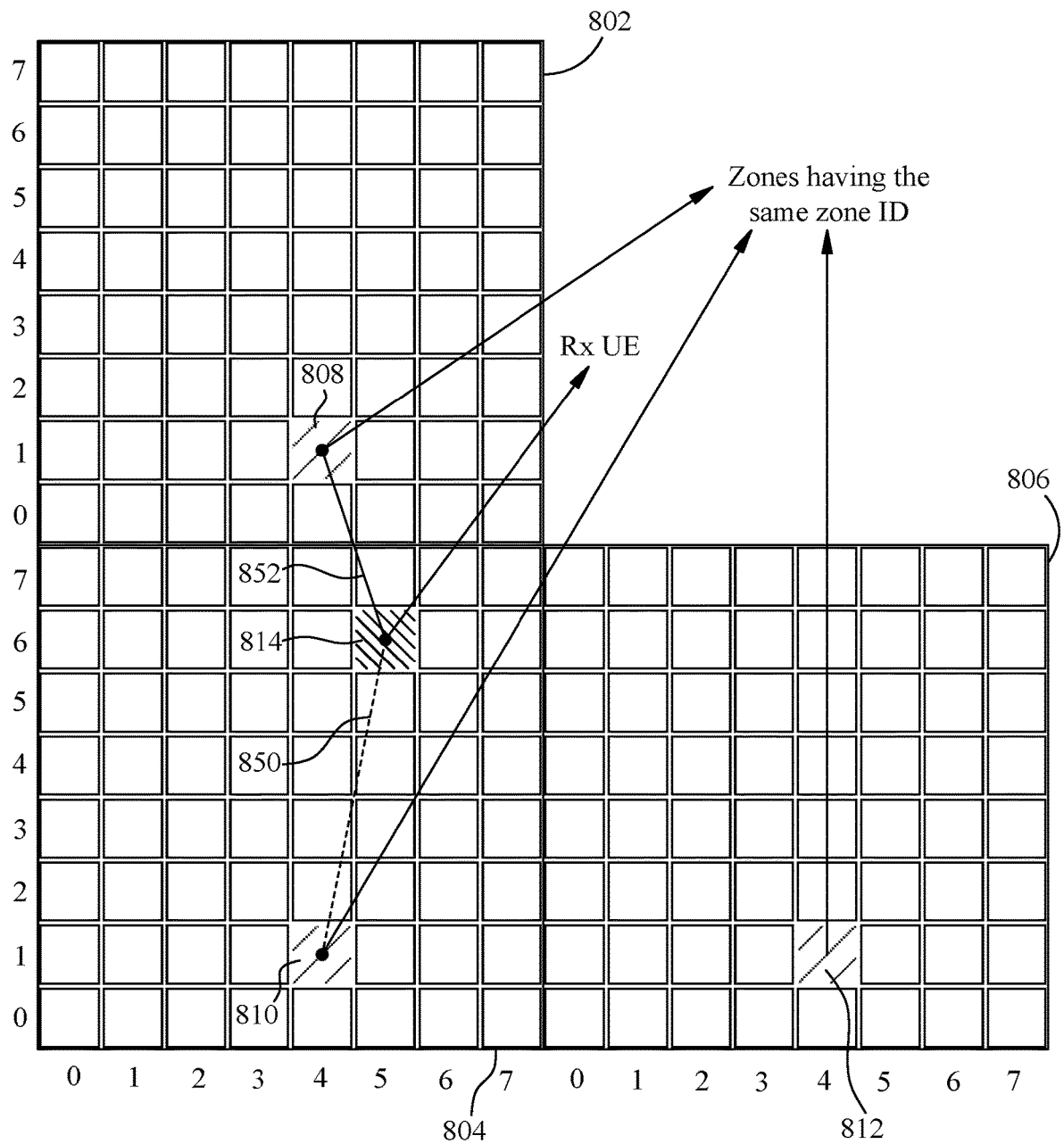
FIG. 8 illustrates multiple zone clusters in which a receiver UE and a transmit UE may be located, in accordance with certain aspects of present disclosure.

FIG. 8 illustrates multiple zone clusters in which an Rx UE and Tx UE may be located, in accordance with certain aspects of present disclosure. As used herein, a cluster generally refers to a set or group of zones. A zone ID indication from a Tx UE to an Rx UE may be ambiguous since multiple zones may have the same zone IDs. In other words, because only a part (e.g., LSB) of a zone ID may be indicated to save signaling overhead, the indicated zone ID may repeat after some distance (e.g., making up a zone cluster). In a zone cluster, each zone has a unique zone ID. For example, three zone clusters 802, 804, 806 are illustrated in FIG. 8. All the zones 808, 810, 812 may have the same zone IDs (e.g., $x_1$ is equal to 4 and $y_1$ is equal to 1 for all of the zones 808, 810, 812). Therefore, when a Rx UE receives a zone ID indication from a Tx UE, the zone ID may indicate a zone in the same cluster (e.g., zone cluster 804) in which the Rx UE is located, or a zone in a different zone cluster (e.g., zone cluster 802, 806). Thus, the Rx UE may determine which zone the Tx UE is assumed to be in for distance calculation, since the computed distance based on different zone cluster assumptions would be different.

Certain aspects of the present disclosure are directed to resolving this ambiguity in Tx-Rx UE distance determination for HARQ feedback purposes. For example, the Rx UE may take additional measures when computing distance based on a received zone ID indication, to resolve the zone ID ambiguity issue described herein. For instance, for the zones sharing the same zone ID indication, the Rx UE may select the zone closest to itself, and the Tx-Rx distance may be determined as the distance between Rx UE and the zone having the indicated zone ID that is closest to the Rx UE.

In certain aspects, the Rx UE computes multiple distances between the Rx UE (e.g., based on Rx UE's zone ID or coordinates, as described herein with respect to FIGS. 6A-6C) and multiple zones having the same zone ID indication. For the multiple zones having the same zone ID indication, at least one zone may be assumed to be in the same zone cluster (e.g. zone cluster 804) in which the Rx UE is located, and at least one zone may be assumed to be in a different zone cluster as the Rx UE. The Rx UE selects the smallest distance from the multiple distances, and determines if HARQ feedback should be transmitted based at least on the smallest distance. As one example, the Rx UE may determine a distance 850 assuming the Tx UE is in zone 810 of zone cluster 804, and a distance 852 assuming the Tx UE is in zone 808 of zone cluster 802. For HARQ feedback, the UE may use the minimum of the calculated distances 850, 852.

Figure 9:
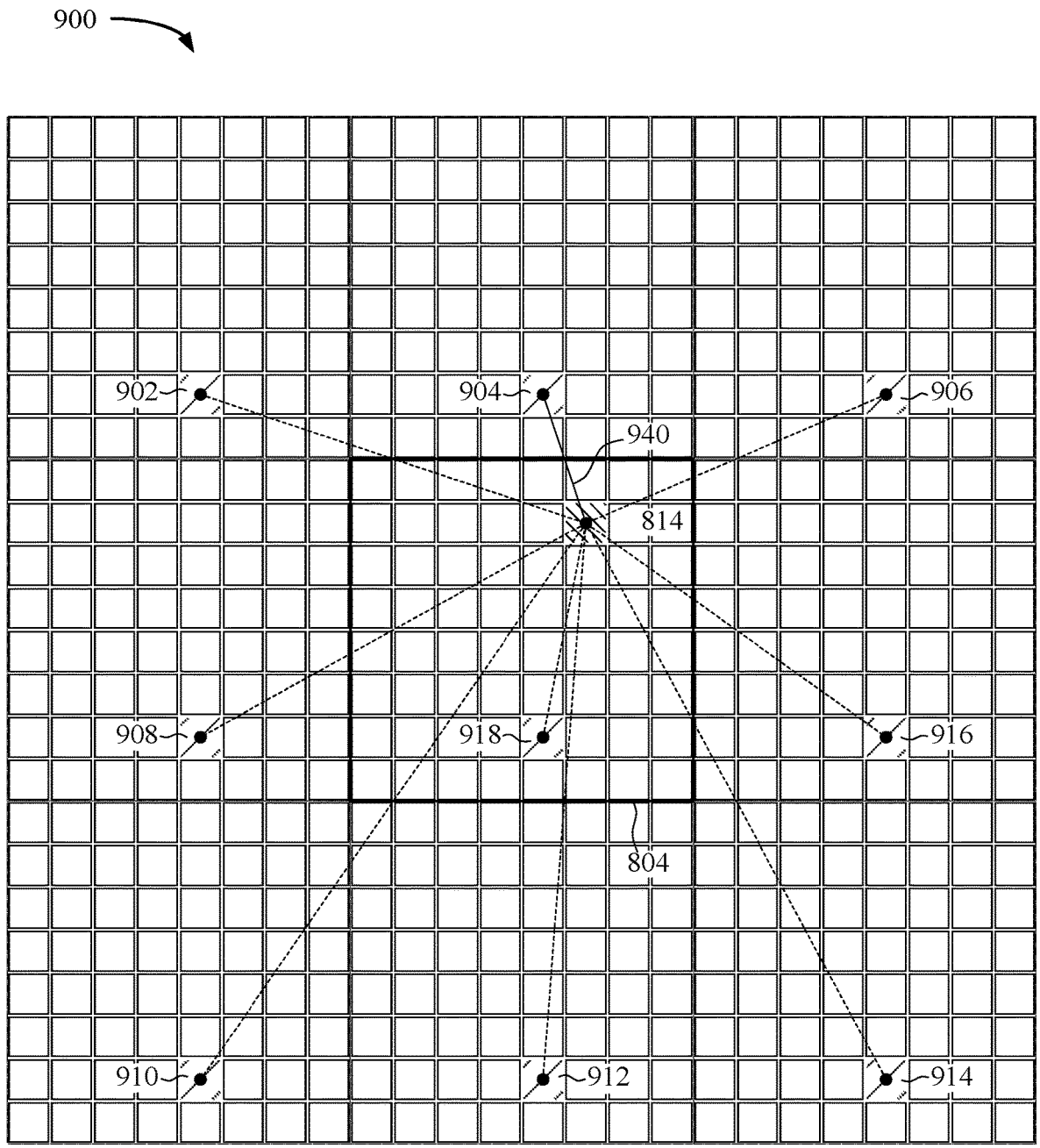
FIG. 9 illustrate nine zones, one of which a receiver (Rx) UE is located, and eight of which surround the Rx UE zone, in accordance with certain aspects of the present disclosure.

FIG. 9 illustrate nine zone clusters, in one of which an Rx UE is located, and eight of which surround (e.g., are adjacent to) the zone cluster the Rx UE is located, in accordance with certain aspects of the present disclosure. As illustrated, the number of zones in a zone cluster is Nx*Ny. In this example, $Nx=Ny=2^3=8$. The Rx UE may determine (x,y) from its geographical coordinates, as described herein. Based on (x,y), the Rx UE determines the zone ID of the zone 814 the Rx UE is located. For example, the Rx UE zone ID may be equal to 53 (e.g., $x_1=5$, $y_1=6$). The Rx UE also receives the Tx UE's zone ID indication, as described herein. In the example illustrated in FIG. 9, the zone ID is equal to 12 (e.g., $x_1=4$, $y_1=1$ for Tx UE). The zone ID of 12 corresponds to any of the zones 902, 904, 906, 908, 910, 912, 914, 916, 918 in the nine zone clusters illustrated in FIG. 9. Thus, the Rx UE may compute 9 distances assuming the Tx UE is in each of the nine zones. One of the distances is based on the assumption that Tx UE is in the same zone cluster 804 as the Rx UE, and the other 8 distances are assuming that Tx UE is in the 8 surrounded zone clusters. The UE may then use the minimum of the calculated distances (e.g., distance 940). Assuming that Tx-Rx distance is the distance of centers of two zones (e.g., as described with respect to FIG. 6B), the distance may be expressed either in meters, or by number of zones.

As described herein, a zone may be expressed by coordinates $(x_1, y_1)$ (e.g., expressed by zone location within a zone cluster). For determining the Rx UE zone location, the Rx UE may first map the zone coordinates in a zone cluster to a massive zone cluster 900 (e.g., including 9 zone clusters). For example, the Rx UE may translate the Rx UEs zone coordinates as follows: $(x_{1,Rx}, y_{1,Rx}) \rightarrow (Nx+x_{1,Rx}, Ny+y_{1,Rx})$. For the Rx UE, $(Nx+x_{1,Rx}, Ny+y_{1,Rx})$ corresponds to a zone in the center zone cluster 804 in the massive zone cluster 900.

For Tx UE zone location, the Rx UE may map the zone coordinates of the indicated zone ID from the Tx UE as follows:

$$(x_{1,Tx}, y_{1,Tx}) \rightarrow (X+x_{1,Tx}, Y+y_{1,Tx})$$

where (X,Y) has 9 possibilities: (0,0), (Nx,0), (2Nx,0), (0,Ny), (Nx, Ny), (2Nx,Ny), (0,2Ny), (Nx,2Ny), (2Nx,2Ny). Each of the nine possibilities for (X,Y) correspond to an assumption that the Tx UE is in one of the nine zones of the massive zone cluster 900.

The Rx UE then computes 9 distance values between $(Nx+x_{1,Rx}, Ny+y_{1,Rx})$ and $(X+x_{1,Tx}, Y+y_{1,Tx})$. The distance may be computed as:

$$d_{Tx-Rx} = \sqrt{(d_x L)^2 + (d_y W)^2} \text{ (in meters); or}$$

$$d_{Tx-Rx} = \sqrt{(d_x)^2 + (d_y)^2} \text{ (in number of zones)}$$

where $d_x=(Nx+x_{1,Rx})-(X+d_y=(Ny+y_{1,Rx})-(Y+y_{1,Tx})$. The Rx UE then selects the smallest distance as the Tx-Rx UE distance for HARQ feedback determination.

Certain aspects of the present disclosure are directed to a wraparound distance determination technique. For example, the Rx UE may determine distances (denoted by $d_x$ and $d_y$) between the Rx UE zone and the indicated Tx UE zone in longitude and latitude (or, in x-axis and y-axis, also referred to herein as "dimensions"), respectively. To determine each of the distances (e.g., $d_y$), the Rx UE computes two distance values, one based on received zone ID directly ($|x_{1,Rx}-x_{1,Tx}|$), and another one based on received zone ID assuming wraparound ($Nx-|x_{1,Rx}-x_{1,Tx}|$). The Rx UE then selects the smaller value from the two distance values (e.g., $d_x$=min ($|x_{1,Rx}-x_{1,Tx}|$, $Nx-|x_{1,Rx}-x_{1,Tx}|$)) The Rx UE then computes the Tx-Rx distance from the determined distances ($d_x$ and $d_y$). For example, the Tx-Rx distance may be expressed either in meters, or by number of zones based on the following equations:

$$d_{Tx-Rx} = \sqrt{(d_x L)^2 + (d_y W)^2} \text{ (in meters); or}$$

$$d_{Tx-Rx} = \sqrt{(d_x)^2 + (d_y)^2} \text{ (in number of zones)}$$

As an example, the Rx UE may first determine (x,y) from its geographical coordinates. Based on (x,y), the Rx UE determines its zone ID. For example, assuming the Rx UE and Tx UE locations illustrated in FIG. 8, zone ID of the zone in which the Rx UE is located may be 53 corresponding to zone 814 for the Rx UE (e.g., $x_{1,Rx}=5$, $y_{1,Rx}=6$). The Rx UE also receives Tx UE's zone ID indication. For example, the zone ID may be 12 (e.g., $x_{1,Tx}=4$, $y_{1,Tx}=1$ for Tx UE in zones 808, 810, 812). The Rx UE then determines the distance (e.g., denoted by $d_x$ and $d_y$) between Rx UE zone and received Tx zone in longitude and latitude (or, in x-axis and y-axis), as follows:

$$d_x=\min(|x_{1,Rx}-x_{1,Tx}|, Nx-|x_{1,Rx}-x_{1,Tx}|)=\min(1,8-1)=1$$

$$d_y=\min(|y_{1,Rx}-y_{1,Tx}|, Ny-|y_{1,Rx}-y_{1,Tx}|)=\min(5,8-5)=1$$

The Tx-Rx distance between two UEs are then determined based on the following equations:

$$d_{Tx-Rx} = \sqrt{(d_x L)^2 + (d_y W)^2} \text{ (in meters); or}$$

$$d_{Tx-Rx} = \sqrt{(d_x)^2 + (d_y)^2} \text{ (in number of zones)}$$

As described herein, the Tx UE may indicate a zone ID to the Rx UE. In some cases, the indication of the zone ID may be a jointly encoded parameter zone ID (e.g., ZoneID=$y_1Nx+x_1$). In other cases, the indication of the zone ID may be an indication of the parameters $x_1$ and $y_1$, as described herein.

Figure 7:
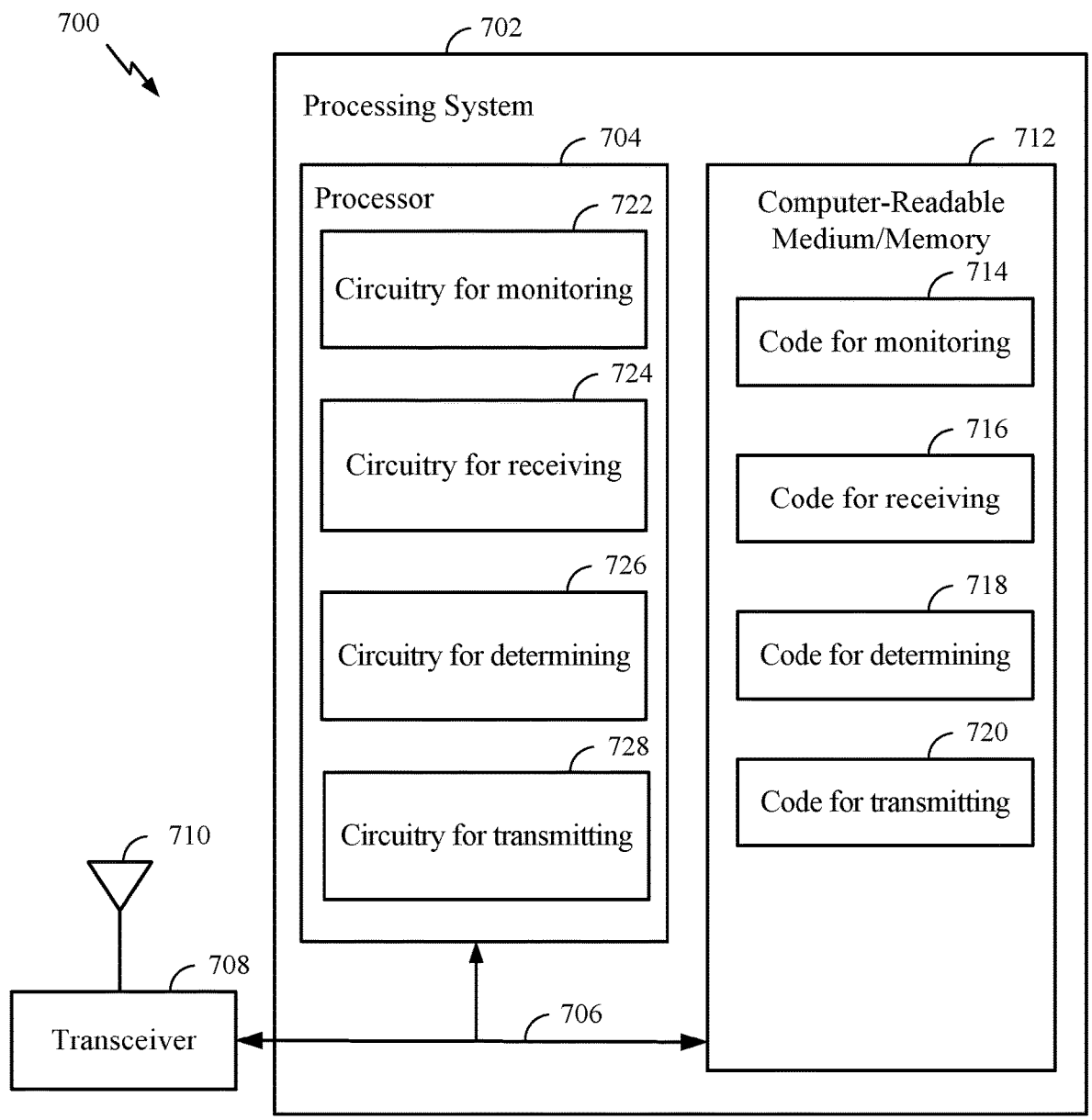
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5, or other operations for performing the various techniques discussed herein for distance-based HARQ signaling. In certain aspects, computer-readable medium/memory 712 stores code 714 (e.g., an example of means for) for monitoring; code 716 (e.g., an example of means for) for receiving, code 718 (e.g., an example of means for) for determining, and code 720 (e.g., an example of means for) for transmitting. One or more of code 714, 716, 718, 720 may be executed by a general-purpose processor, a digital signal processor (DSP), an application-specific integrated circuit (ASIC), a field programmable gate array (FPGA) or other programmable logic device. In certain aspects, the processor 704 executes the code stored in the computer-readable medium/memory 712. In certain aspects, computer-readable medium/memory 712 is an example of a HARQ manager 122

In certain aspects, alternatively or additionally, the processor 704 has circuitry configured to implement the code stored in the computer-readable medium/memory 712. The processor 704 includes circuitry 722 (e.g., an example of means for) for monitoring; circuitry 724 (e.g., an example of means for) for receiving; circuitry 726 (e.g., an example of means for) for determining; and circuitry 728 (e.g., an example of means for) for transmitting.

One or more of circuitry 722, 724, 726, 728 may be implemented by one or more of a general-purpose processor, a digital signal processor (DSP), an application-specific integrated circuit (ASIC), a field programmable gate array (FPGA) or other programmable logic device. In certain aspects, processor 704 is an example of a HARQ manager 122.

The transceiver 708 may provide a means for receiving information. Information may be passed on to other components of the device 700. The transceiver 708 may be an example of aspects of the transceiver 254 described with reference to FIG. 2. The antenna 710 may correspond to a single antenna or a set of antennas. The transceiver 708 may provide means for transmitting signals generated by other components of the device 700.

The HARQ manager 122 may support wireless communication in accordance with examples as disclosed herein.

The HARQ manager 122 may be an example of means for performing various aspects described herein. The HARQ manager 122, or its sub-components, may be implemented in hardware (e.g., in uplink resource management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the HARQ manager 122, or its sub-components, may be implemented in code (e.g., as uplink resource management software or firmware) executed by a processor, or any combination thereof. If implemented in code executed by a processor, the functions of the HARQ manager 122, or its sub-components may be executed by a general-purpose processor, a digital signal processor (DSP), an application-specific integrated circuit (ASIC), a field programmable gate array (FPGA) or other programmable logic device.

In some examples, the HARQ manager 122 may be configured to perform various operations (e.g., receiving, determining, transmitting) using or otherwise in cooperation with the transceiver 708.

The HARQ manager 122, or its sub-components, may be physically located at various positions, including being distributed such that portions of functions are implemented at different physical locations by one or more physical components. In some examples, the HARQ manager 122, or its sub-components, may be a separate and distinct component in accordance with various aspects of the present disclosure. In some examples, the HARQ manager 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Aspects

Aspect 1. A method for wireless communication by a user-equipment (UE), comprising: receiving, from another UE, an indication of a first zone identifier (ID); determining a nearest zone to the UE of multiple zones, wherein the multiple zones are determined based at least in part on the indication of the first zone ID; determining a distance between the UE and the other UE based on the first zone ID, wherein the determined distance comprises a distance between the UE and the nearest zone; and transmitting hybrid automatic repeat request (HARQ) feedback for the data transmission based at least on the distance.

Aspect 2. A method for wireless communication by a user-equipment (UE), comprising: monitoring for a data transmission from another UE; receiving an indication of a first zone identifier (ID); determining a nearest zone to the UE of multiple zones, wherein the multiple zones are determined based at least in part on the indication of the first zone ID; determining a distance between the UE and the other UE based on the first zone ID, wherein the determined distance comprises a distance between the UE and the nearest zone; and transmitting hybrid automatic repeat request (HARQ) feedback for the data transmission based at least on the distance.

Aspect 3. The method of one of aspects 1-2, wherein the first zone ID is associated with one of a plurality of zones of a zone cluster, and wherein the plurality of zones comprise a first plurality of zones in a first dimension and a second plurality of zones in a second dimension, wherein a quantity of the first plurality of zones and a quantity of the second plurality of zones are the same.

Aspect 4. The method of one of aspects 1-2, wherein the determined distance comprises a minimum of a plurality of distances calculated based on the first zone ID.

Aspect 5. The method of aspect 4, wherein the first zone ID corresponds to a zone in each of a plurality of zone clusters, and wherein each of the plurality of distances is calculated based at least in part on the first zone ID corresponding to a different one of the plurality of zone clusters.

Aspect 6. The method of one of aspects 4-5, wherein one of the plurality of zone clusters comprises a zone cluster in which the UE is located, and wherein at least another one of the plurality of zone clusters is adjacent to the one of the plurality of zone clusters.

Aspect 7. The method of one of aspects 1-2, wherein the first zone ID is associated with a first zone in which the other UE is located, and wherein the determining the distance comprises: determining a first quantity of zones in a first dimension between the first zone and a second zone, the first zone being in a zone cluster, wherein the UE is located in the second zone; and determining a second quantity of zones, the second quantity of zones corresponding to a difference between a total number of zones of the zone cluster in the first dimension and the first quantity of zones, wherein the distance is determined based on a minimum of the first quantity of zones and the second quantity of zones.

Aspect 8. The method of aspect 7, wherein the determining the distance further comprises: determining a third quantity of zones in a second dimension between the first zone and the second zone; and determining a fourth quantity of zones, the fourth quantity of zones corresponding to a difference between a total number of zones of the zone cluster in the second dimension and the third quantity of zones, wherein the distance is further determined based on a minimum of the third quantity of zones and the fourth quantity of zones.

Aspect 9. The method of one of aspects 1-2, wherein transmitting the HARQ feedback for the data transmission based on the distance comprises transmitting the HARQ feedback for the data transmission if the distance is less than a distance threshold.

Aspect 10. The method of aspect 9, wherein transmitting the HARQ feedback for the data transmission based on the distance comprises transmitting the HARQ feedback for the data transmission if the HARQ feedback is a negative acknowledgment (NACK).

Aspect 11. The method of one of aspects 1-2, wherein the indication of the first zone ID is received via sidelink control information, a medium access control (MAC) control element (CE), higher layer signaling, or any combination thereof.

Aspect 12. The method of one of aspects 1-2, further comprising determining a second zone ID associated with a second zone in which the UE is located, wherein the determining of the distance is further based on the second zone ID.

Aspect 13. The method of aspect 12, wherein the first zone ID is associated with a first zone in which the other UE is located, and wherein the determined distance comprises a distance between a reference point in the first zone in which the other UE is located and a reference point in the second zone in which the UE is located.

Aspect 14. The method of one of aspects 12-13, wherein the reference points in the first zone and the second zone comprise centers of the first zone and the second zone or one of four corners of each of the first zone and the second zone.

Aspect 15. The method of one of aspects 12-14, further comprising determining a location of the UE, wherein the second zone ID of the second zone in which the UE is located is determined based on the determined location of the UE.

Aspect 16. The method of one of aspects 1-2, wherein the first zone ID is associated with one of a plurality of zones of a zone cluster, wherein the determined distance between the UE and the other UE is further determined based on a size of the plurality of zones.

Aspect 17. The method of one of aspects 1-2, wherein the first zone ID is associated with a first zone in which the other UE is located, the method further comprising: determining a location of the UE; and determining a location of the first zone in which the other UE is located, wherein the distance between the UE and the other UE is determined based on the location of the first zone in which the other UE is located and the location of the UE.

Aspect 18. The method of aspect 17, wherein determining the location of the UE comprises determining a longitudinal distance from the UE to a reference point on earth and a latitudinal distance from the UE to the reference point on earth.

Aspect 19. The method of one of aspects 17-18, further comprising determining a location of a second zone in which the UE is located, wherein the location of the first zone in which the other UE is located is determined based on the location of the second zone in which the UE is located.

Aspect 20. The method of claim 19, wherein the first zone ID is associated with one of a plurality of zones of a zone cluster, wherein the location of the first zone in which the other UE is located is determined further based on a size of the plurality of zones.

Aspect 21. The method of one of aspects 19-20, wherein the location of the first zone in which the other UE is located is determined further based on a quantity of zones between the first zone in which the other UE is located and the second zone in which the UE is located.

Aspect 22. The method of aspect 21, wherein the quantity of zones between the first zone in which the other UE is located and the second zone in which the UE is located is determined based on the first zone ID and a second zone ID of the second zone in which the UE is located.

Aspect 23. The method of one of aspects 19-22, wherein the location of the second zone in which the UE is located is determined further based on the location of the UE.

Aspect 24. The method of one of aspects 19-23, wherein the first zone ID is associated with one of a plurality of zones of a zone cluster, wherein the location of the first zone in which the other UE and the location of the second zone in which the UE is located are determined based on a size of the plurality of zones.

Aspect 25. The method of one of aspects 19-24, wherein the location of a second zone in which UE is located comprises a location of a reference in the second zone.

Aspect 26. The method of one of aspects 17-25, wherein the location of the first zone in which the other UE is located comprises a location of a reference point in the first zone.

Aspect 27. The method of aspect 26, wherein the reference point in the first zone comprise a center of the first zone, or one of four corners of the first zone.

Aspect 28. An apparatus for wireless communication by a first user-equipment (UE), comprising: a memory; and one or more processors coupled to the memory, the one or more processors and the memory being configured to: monitor for a data transmission from a second UE; receive an indication of a first zone identifier (ID); determine a nearest zone to the first UE of multiple zones, wherein the multiple zones are determined based at least in part on the indication of the first zone ID; determine a distance between the first UE and the second UE based on the first zone ID, wherein the determined distance comprises a distance between the first UE and the nearest zone; and transmit hybrid automatic repeat request (HARQ) feedback for the data transmission based at least on the distance.

Aspect 29. An apparatus for wireless communication by a first user-equipment (UE), comprising: means for monitoring for a data transmission from a second UE; means for receiving an indication of a first zone identifier (ID); means for determining a nearest zone to the first UE of multiple zones, wherein the multiple zones are determined based at least in part on the indication of the first zone ID; means for determining a distance between the first UE and the second UE based on the first zone ID, wherein the determined distance comprises a distance between the first UE and the nearest zone; and means for transmitting hybrid automatic repeat request (HARQ) feedback for the data transmission based at least on the distance.

Aspect 30. A computer-readable medium having instructions stored thereon to cause a first user-equipment (UE) to: monitor for a data transmission from a second UE; receive an indication of a first zone identifier (ID); determine a nearest zone to the first UE of multiple zones, wherein the multiple zones are determined based at least in part on the indication of the first zone ID; determine a distance between the first UE and the second UE based on the first zone ID, wherein the determined distance comprises a distance between the first UE and the nearest zone; and transmit hybrid automatic repeat request (HARQ) feedback for the data transmission based at least on the distance.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user-equipment (UE), comprising:
   monitoring for a data transmission from another UE;
   receiving an indication of a first zone identifier (ID) associated with multiple zones;
   determining a nearest zone to the UE of the multiple zones, wherein the multiple zones are determined based at least in part on the indication of the first zone ID;
   determining a distance between the UE and the other UE based on the first zone ID, wherein the determined distance comprises a distance between the UE and the nearest zone; and
   transmitting hybrid automatic repeat request (HARQ) feedback for the data transmission based at least on the distance.

2. The method of claim 1, wherein the first zone ID is associated with one of a plurality of zones of a zone cluster, and wherein the plurality of zones comprise a first plurality of zones in a first dimension and a second plurality of zones in a second dimension, wherein a quantity of the first plurality of zones and a quantity of the second plurality of zones are the same.

3. The method of claim 1, wherein the determined distance comprises a minimum of a plurality of distances calculated based on the first zone ID.

4. The method of claim 3, wherein the first zone ID corresponds to a zone in each of a plurality of zone clusters, and wherein each of the plurality of distances is calculated based at least in part on the first zone ID corresponding to a different one of the plurality of zone clusters.

5. The method of claim 4, wherein one of the plurality of zone clusters comprises a zone cluster in which the UE is located, and wherein at least another one of the plurality of zone clusters is adjacent to the one of the plurality of zone clusters.

6. The method of claim 1, wherein the first zone ID is associated with a first zone in which the other UE is located, and wherein the determining the distance comprises:
   determining a first quantity of zones in a first dimension between the first zone and a second zone, the first zone being in a zone cluster, wherein the UE is located in the second zone; and
   determining a second quantity of zones, the second quantity of zones corresponding to a difference between a total number of zones of the zone cluster in the first dimension and the first quantity of zones, wherein the distance is determined based on a minimum of the first quantity of zones and the second quantity of zones.

7. The method of claim 6, wherein the determining the distance further comprises:
   determining a third quantity of zones in a second dimension between the first zone and the second zone; and
   determining a fourth quantity of zones, the fourth quantity of zones corresponding to a difference between a total number of zones of the zone cluster in the second dimension and the third quantity of zones, wherein the distance is further determined based on a minimum of the third quantity of zones and the fourth quantity of zones.

8. The method of claim 1, wherein transmitting the HARQ feedback for the data transmission based on the distance comprises transmitting the HARQ feedback for the data transmission if the distance is less than a distance threshold.

9. The method of claim 8, wherein transmitting the HARQ feedback for the data transmission based on the distance comprises transmitting the HARQ feedback for the data transmission if the HARQ feedback is a negative acknowledgment (NACK).

10. The method of claim 1, wherein the indication of the first zone ID is received via sidelink control information, a medium access control (MAC) control element (CE), higher layer signaling, or any combination thereof.

11. The method of claim 1, further comprising determining a second zone ID associated with a second zone in which the UE is located, wherein the determining of the distance is further based on the second zone ID.

12. The method of claim 11, wherein the first zone ID is associated with a first zone in which the other UE is located, and wherein the determined distance comprises a distance between a reference point in the first zone in which the other UE is located and a reference point in the second zone in which the UE is located.

13. The method of claim 12, wherein the reference points in the first zone and the second zone comprise centers of the first zone and the second zone or one of four corners of each of the first zone and the second zone.

14. The method of claim 11, further comprising determining a location of the UE, wherein the second zone ID of the second zone in which the UE is located is determined based on the determined location of the UE.

15. The method of claim 1, wherein the first zone ID is associated with one of a plurality of zones of a zone cluster, wherein the determined distance between the UE and the other UE is further determined based on a size of the plurality of zones.

16. The method of claim 1, wherein the first zone ID is associated with a first zone in which the other UE is located, the method further comprising:
   determining a location of the UE; and
   determining a location of the first zone in which the other UE is located, wherein the distance between the UE and the other UE is determined based on the location of the first zone in which the other UE is located and the location of the UE.

17. The method of claim 16, wherein determining the location of the UE comprises determining a longitudinal distance from the UE to a reference point on earth and a latitudinal distance from the UE to the reference point on earth.

18. The method of claim 16, further comprising determining a location of a second zone in which the UE is located, wherein the location of the first zone in which the other UE is located is determined based on the location of the second zone in which the UE is located.

19. The method of claim 18, wherein the first zone ID is associated with one of a plurality of zones of a zone cluster, wherein the location of the first zone in which the other UE is located is determined further based on a size of the plurality of zones.

20. The method of claim 18, wherein the location of the first zone in which the other UE is located is determined further based on a quantity of zones between the first zone in which the other UE is located and the second zone in which the UE is located.

21. The method of claim 20, wherein the quantity of zones between the first zone in which the other UE is located and the second zone in which the UE is located is determined based on the first zone ID and a second zone ID of the second zone in which the UE is located.

22. The method of claim 18, wherein the location of the second zone in which the UE is located is determined further based on the location of the UE.

23. The method of claim 18, wherein the first zone ID is associated with one of a plurality of zones of a zone cluster, wherein the location of the first zone in which the other UE and the location of the second zone in which the UE is located are determined based on a size of the plurality of zones.

24. The method of claim 18, wherein the location of a second zone in which UE is located comprises a location of a reference in the second zone.

25. The method of claim 16, wherein the location of the first zone in which the other UE is located comprises a location of a reference point in the first zone.

26. The method of claim 25, wherein the reference point in the first zone comprise a center of the first zone, or one of four corners of the first zone.

27. An apparatus for wireless communication by a first user-equipment (UE), comprising:
   a memory; and
   one or more processors coupled to the memory, the one or more processors and the memory being configured to:
      monitor for a data transmission from a second UE;
      receive an indication of a first zone identifier (ID) associated with multiple zones;
      determine a nearest zone to the first UE of the multiple zones, wherein the multiple zones are determined based at least in part on the indication of the first zone ID;
      determine a distance between the first UE and the second UE based on the first zone ID, wherein the determined distance comprises a distance between the first UE and the nearest zone; and
      transmit hybrid automatic repeat request (HARQ) feedback for the data transmission based at least on the distance.

28. An apparatus for wireless communication by a first user-equipment (UE), comprising:
   means for monitoring for a data transmission from a second UE;
   means for receiving an indication of a first zone identifier (ID) associated with multiple zones;
   means for determining a nearest zone to the first UE of the multiple zones, wherein the multiple zones are determined based at least in part on the indication of the first zone ID;
   means for determining a distance between the first UE and the second UE based on the first zone ID, wherein the determined distance comprises a distance between the first UE and the nearest zone; and
   means for transmitting hybrid automatic repeat request (HARQ) feedback for the data transmission based at least on the distance.

29. A non-transitory computer-readable medium having instructions stored thereon to cause a first user-equipment (UE) to:
   monitor for a data transmission from a second UE;
   receive an indication of a first zone identifier (ID) associated with multiple zones;
   determine a nearest zone to the first UE of the multiple zones, wherein the multiple zones are determined based at least in part on the indication of the first zone ID;
   determine a distance between the first UE and the second UE based on the first zone ID, wherein the determined distance comprises a distance between the first UE and the nearest zone; and
   transmit hybrid automatic repeat request (HARQ) feedback for the data transmission based at least on the distance.

* * * * *